(12) United States Patent
Lacombe et al.

(10) Patent No.: US 7,000,100 B2
(45) Date of Patent: *Feb. 14, 2006

(54) APPLICATION-LEVEL SOFTWARE WATCHDOG TIMER

(75) Inventors: John Lacombe, Austin, TX (US); Jeffery L. Galloway, The Woodlands, TX (US); Tim Majni, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 712 days.

This patent is subject to a terminal disclaimer.

(21) Appl. No.: 09/870,965

(22) Filed: May 31, 2001

(65) Prior Publication Data

US 2002/0184482 A1 Dec. 5, 2002

(51) Int. Cl.
*G06F 15/177* (2006.01)

(52) U.S. Cl. .................. 713/1; 713/1; 713/2; 713/100; 713/500; 713/502; 709/203; 709/220; 709/230; 719/318; 719/321; 719/327; 719/328; 719/329; 719/330

(58) Field of Classification Search ............... 713/1, 713/2, 100, 5; 714/52, 55; 719/318, 321, 719/328, 329, 330, 327; 709/203, 220, 230
See application file for complete search history.

(56) References Cited

U.S. PATENT DOCUMENTS

| | | | | |
|---|---|---|---|---|
| 4,635,187 A | * | 1/1987 | Baron et al. ................. 718/100 |
| 5,333,285 A | * | 7/1994 | Drerup ........................ 714/23 |
| 5,341,497 A | * | 8/1994 | Younger ...................... 714/51 |
| 5,390,324 A | * | 2/1995 | Burckhartt et al. ........... 714/23 |
| 5,594,865 A | * | 1/1997 | Saitoh ......................... 714/55 |
| 5,748,882 A | * | 5/1998 | Huang ......................... 714/47 |
| 5,815,144 A | * | 9/1998 | Strothmann .................. 715/717 |
| 5,961,622 A | * | 10/1999 | Hudson et al. ............. 710/107 |
| 5,978,911 A | * | 11/1999 | Knox et al. .................... 713/1 |
| 5,978,912 A | * | 11/1999 | Rakavy et al. ................ 713/2 |
| 5,978,939 A | * | 11/1999 | Mizoguchi et al. ........... 714/55 |
| 6,026,454 A | * | 2/2000 | Hauck et al. ................. 710/65 |
| 6,112,320 A | * | 8/2000 | Dien ........................... 714/51 |
| 6,141,774 A | * | 10/2000 | Mattheis ...................... 714/27 |
| 6,266,781 B1 | * | 7/2001 | Chung et al. ................. 714/4 |
| 6,393,589 B1 | * | 5/2002 | Smit et al. .................... 714/55 |
| 6,393,590 B1 | * | 5/2002 | Wood et al. .................. 714/55 |
| 6,496,890 B1 | * | 12/2002 | Azevedo et al. ............ 710/110 |
| 6,505,298 B1 | * | 1/2003 | Cerbini et al. ................. 713/1 |
| 6,560,726 B1 | * | 5/2003 | Vrhel et al. ................... 714/55 |
| 6,615,312 B1 | * | 9/2003 | Hamlin et al. .............. 711/112 |
| 6,665,758 B1 | * | 12/2003 | Frazier et al. .............. 710/200 |
| 6,754,855 B1 | * | 6/2004 | Denninghoff et al. ......... 714/48 |
| 6,799,318 B1 | * | 9/2004 | Davison et al. ............. 719/328 |

(Continued)

*Primary Examiner*—Lynne H. Browne
*Assistant Examiner*—Nitin C. Patel (57) ABSTRACT

A software implementation of an application watchdog, comprising a restart service operating in the user mode and a watchdog driver operating in the kernel mode of a computer operating system. The driver incorporates a system thread configured to monitor a plurality of user applications operating in the user mode. The driver provides a first IOCTL signal interface for communicating control signals between the watchdog driver and one of the user applications and a second IOCTL signal interface for communicating control signals between the watchdog driver and the restart service. A communication interface exists for coordinating timer events with the operating system scheduler. If the system thread does not receive a message from one of said applications within an allotted period of time, the timer event alerts the watchdog driver that the allotted time has elapsed and the watchdog driver signals the restart service to restart that application.

24 Claims, 4 Drawing Sheets

U.S. PATENT DOCUMENTS 6,850,257 B1 * 2/2005 Colleran et al. ............ 715/804
6,851,074 B1 * 2/2005 Miloiicic et al. ............. 714/20
2001/0044339 A1 * 11/2001 Cordero et al. ............... 463/42
2002/0162053 A1 * 10/2002 Os .............................. 714/38
2004/0244014 A1 * 12/2004 Davison et al. ............. 719/321

* cited by examiner

APPLICATION-LEVEL SOFTWARE WATCHDOG TIMER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to watchdog timers for personal computer systems. More specifically, the preferred embodiment relates to the use of a software watchdog timer to monitor the uptime of individual applications running on a computer system.

2. Background of the Invention

Watchdog circuits are rather common in modem computer systems. A watchdog circuit is one way of creating a stable computing platform. In fact, when one speaks of a stable, robust computer system, the watchdog circuit is indirectly one of the reasons that the system has these attributes. Computer designers rely on the watchdog circuit to reset the system in the unfortunate event something goes wrong. If a computer system hangs or locks up, the watchdog circuit can perform a number of tasks, including logging error information, checking memory, and rebooting the system so the computer will be up and running again in a short amount of time.

A watchdog circuit typically is a timing circuit that measures a certain system activity or activities. If the system activity does not occur within a prescribed timer period, the watchdog circuit generates an output signal indicating that the activity has not occurred. In its simplest form, the watchdog timer insures that the system is operational. Modem watchdog circuits are capable of performing a variety of tasks, but the heart of a watchdog timer is essentially just a counter. The timer continually counts up or down using the system clock towards a predetermined value until one of two things happen. First, the counter can be cleared so that the amount of time required to count to the predetermined value is pushed back to the maximum value. For example, if a timer counts from a maximum value of 300 seconds towards a minimum value of zero seconds, then when the timer is cleared, the clock will revert back to the maximum value and continue counting down from 300 seconds. The clear command (sometimes referred to as "hitting the watchdog") is typically issued by the operating system (OS). Programmers will insert commands in the OS code instructing the OS to periodically hit the watchdog. Thus, as long as the OS is operating as intended, the watchdog timer will be cleared periodically and the timer never reaches the predetermined value.

The second thing that may happen as the watchdog timer is running is that the counter actually does reach the predetermined value. This obviously occurs if the watchdog is never hit and the timer is never cleared. In this case, the watchdog timer will issue a reset command to the system and the computer will reboot. This type of automatic recovery is particularly helpful in unmanned computer systems. Obviously, if a user is working at a computer system and the OS becomes unresponsive, the user can initiate the reset procedure themselves. If, on the other hand, the computer is generally unmanned and working as a server in a computer network, it may not be readily obvious that the computer has ceased normal operations. The first person affected by such a condition will likely be a network user who discovers that they can't access a network database or perhaps their email. Thus, if a server becomes inoperative, the watchdog timer guarantees that the system will be up and running again in a short amount of time.

In their present configuration, conventional watchdog timers are certainly useful for their intended purpose. However, there are a number of drawbacks that can be improved upon by a more modem approach. From the perspective of server customers, the health of the OS is not necessarily the most important aspect of a network server. More often than not, a server actually exists to run a specific application and the proper operation of that application is the most important goal for the customer. Thus, if the key application or applications cease operation, but the OS effectively continues, the system will never reset and the customer experiences unwanted downtime.

Another problem with conventional systems is that the fix for a system lock-up is a full system reset or reboot operation. A more efficient solution to this problem is to first restart the failed application. The time required to end an application process and subsequently restart of that application is much less than the time required to reset the entire system. If the application is successfully restarted, the end result is a decrease in downtime. If, however the OS is unresponsive as well, the conventional watchdog timer will still recover the application by forcing a system reset. In either case, the minimum required downtime is achieved.

It is desirable therefore, to develop an application-level watchdog timer that is capable of monitoring key applications and reviving those applications in the event the applications become unresponsive. The application-level watchdog timer may work in conjunction with a system level watchdog timer to provide a staggered level of protection that may advantageously improve computer server uptime.

BRIEF SUMMARY OF THE INVENTION

The problems noted above are solved in large part by a software implementation of an application watchdog comprising a restart service operating in the user mode of a computer operating system and a watchdog driver operating in the kernel mode of the computer operating system. The driver includes a system thread configured to monitor a plurality of user applications that operate in the user mode of the computer operating system. The watchdog driver also provides a first input/output control (IOCTL) signal interface for communicating control signals between the watchdog driver and one of the user applications and a second IOCTL signal interface for communicating control signals between the watchdog driver and the restart service. Lastly, a communication interface is provided for coordinating timer events with the operating system scheduler. Each timer event corresponds to one of the applications and indicates when the application is presumed to be unresponsive.

If the system thread does not receive a message from an application within an allotted period of time, the timer event alerts the watchdog driver that the allotted time has elapsed and the watchdog driver signals the restart service to restart that application. If the system thread does receive a message from one the applications, the timer event corresponding to that application is updated to reflect the current time plus the allotted period of time. The restart service may also be configured to perform a system reset. Other functions that may be performed by the restart service include: user notification, error logging, and multiple application reset. In addition, the plurality of applications may be prioritized by a computer user to permit varying levels of watchdog protection.

In the preferred embodiment, the messages from the applications are sent periodically by the applications and directed specifically to the watchdog driver. The messages are preferably sent to the watchdog driver via a message passing interface between the user mode and kernel mode. The message passing interface is preferably implemented as shared memory queues.

Initialization of the watchdog driver involves loading the watchdog driver as the operating system loads following a computer system boot. During driver initialization, an initial input/output control (IOCTL) signal interface is loaded and created to establish the message passing interface. A second IOCTL signal interface for communication with the reset service is also created. The restart service is initialized by loading the reset service in the kernel mode of the computer operating system and calling the watchdog driver via the second IOCTL signal interface to verify communication with the watchdog driver.

The computer application is initialized by linking the application with a dynamic link library and calling the watchdog driver via the dynamic link library to validate the message passing interface. Once this is completed, application information such as the relevant location and process identification is sent to the watchdog driver. The driver sets up timer events for that application and forwards the application information to the reset service. The reset service is then capable of locating and resetting a given application in the event that application becomes unresponsive.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
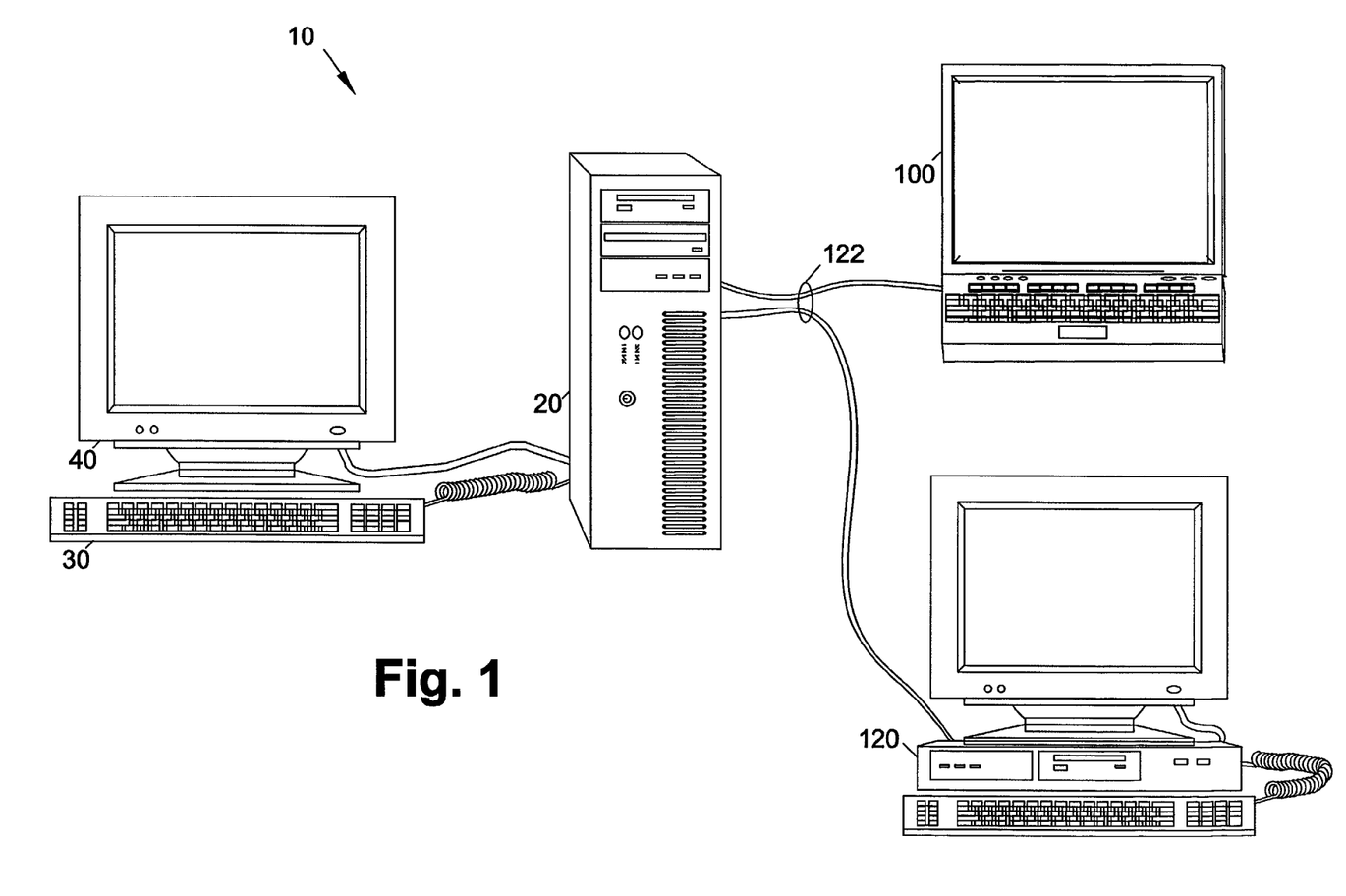
FIG. 1 shows a simple computer network comprising a computer system in which the preferred embodiment may be implemented.

Turning now to the figures, FIG. 1 shows an example of a simple computer network 10 comprising a plurality of computers. At least one of the computers 20 operates as a central server providing data to the other node computers 100, 120, which are connected to the same network 10. The central server 20 is coupled to the first computer 100 and the second computer 120 by network connections 122. Various other network components such as hubs, switches, modems, and routers may be included in the network 10, but are not shown in FIG. 1. It is envisioned server 20 incorporates the preferred embodiment of the invention. Computers 100, 120 may preferably be "client" computers and may also implement the preferred embodiment. Although a client/server configuration is shown, the computer network may also be an enterprise network, a peer network, a wide area network, a web network or any other suitable network configuration.

The central server 20 preferably includes at least one input device such as a keyboard 30 and at least one output device such as a monitor 40. Other I/O devices such as a mouse, printer, keyboard, and speakers are certainly permissible and are perhaps desirable peripheral components.

Users working on computers 100, 120 may remotely access data such as file databases or software applications located on the server 20. Alternatively, software applications may be loaded and run directly on the computers 100, 120, but licenses for the authorized use thereof are located on the central server 20. In either event, if a key application that is needed to provide data from the central server 20 to the network computers 100, 120 becomes unresponsive, that data will become unavailable and users on the network will be inconvenienced.

It can be appreciated therefore, that the ability to restart a failed application without rebooting the operating system of the server 20 provides certain advantages. The biggest advantage derives from the fact that the total time required to end a process for a key application and restart that application is much less than the time required to reboot the server 20 on which that application is run. The preferred system ensures that the network users are not inconvenienced for an unreasonably lengthy period of time.

Figure 2:
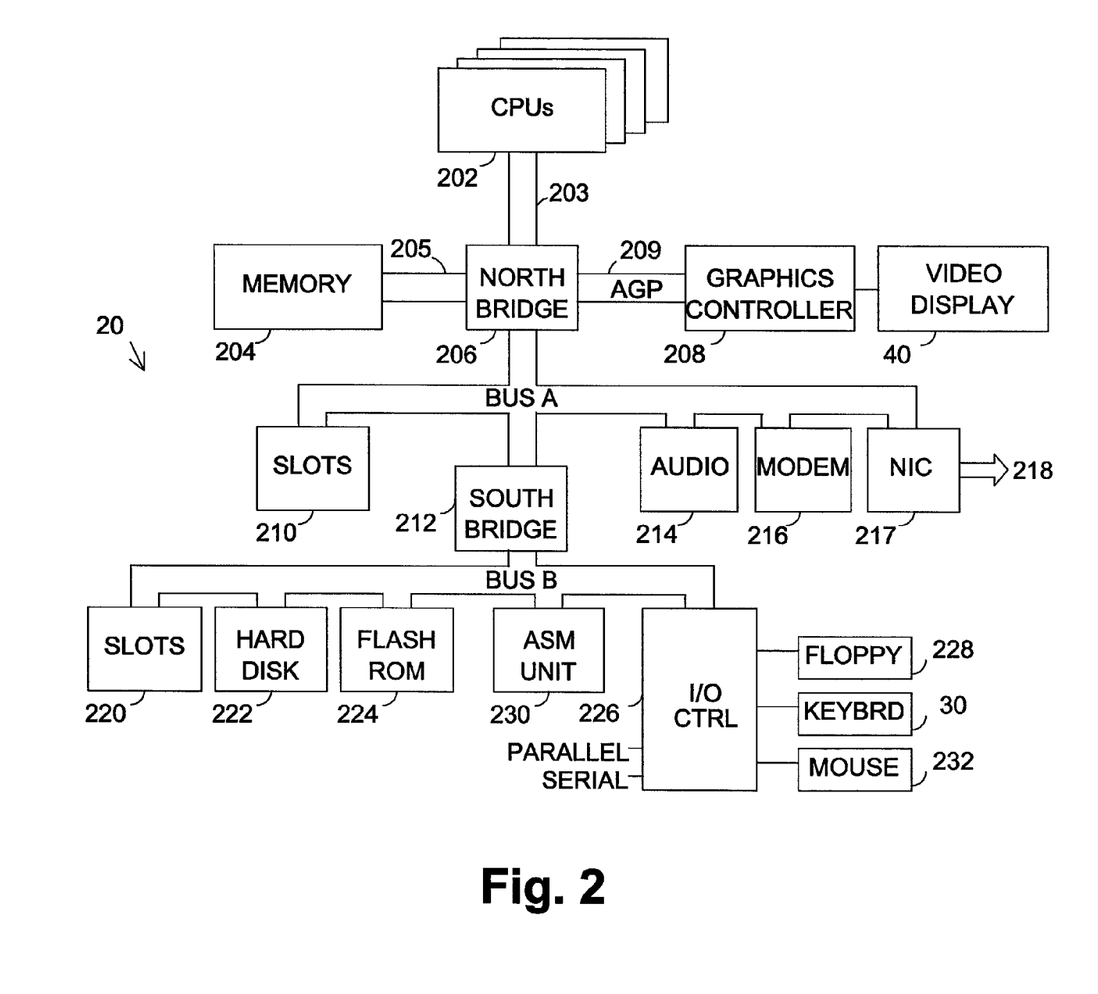
FIG. 2 shows a block diagram of a computer system in which the preferred embodiment may be implemented.

Referring now to FIG. 2, a representative computer system is illustrated. It is noted that many other representative configurations exist and that this embodiment is described for illustrative purposes. For the following discussion, the computer system of FIG. 2 is assumed to represent server computer 20, but one of skill in the art will recognize that the invention may be implemented as part of any computer system. The computer system 20 of FIG. 2 preferably includes a CPU 202 coupled to a bridge logic device 206 via a CPU bus 203. The bridge logic device 206 is sometimes referred to as a "North bridge" for no other reason than it often is depicted at the upper end of a computer system drawing. The North bridge 206 also couples to a main memory array 204 by a memory bus 205, and may further couple to a graphics controller 208 via an accelerated graphics port (AGP) bus 209. The graphics controller 208 drives the video display 40. The North bridge 206 couples CPU 202, memory 204, and graphics controller 208 to each other and to various peripheral devices in the system through a primary expansion bus (BUS A) such as a PCI bus or an EISA bus. Various components that comply with the bus protocol of BUS A may reside on this bus, such as an audio device 214, a modem 216, and a network interface card (NIC) 217. NIC 217 is coupled to a network 218 for communication with other computers. The above components may be integrated onto the motherboard as presumed by FIG. 2, or they may be plugged into expansion slots 210 that are connected to BUS A.

If other, secondary, expansion buses are provided in the computer system 20, as is typically the case, another bridge logic device 212 is used to couple the primary expansion bus (BUS A) to the secondary expansion bus (BUS B). This bridge logic 212 is sometimes referred to as a "South bridge" reflecting its location vis-à-vis the North bridge 206 in a typical computer system drawing. An example of such bridge logic is described in U.S. Pat. No. 5,634,073, assigned to Compaq Computer Corporation. Various components that comply with the bus protocol of BUS B may reside on this bus, such as hard disk controller 222, Flash ROM 224, and I/O Controller 226. Slots 220 may also be provided for plug-in components that comply with the protocol of BUS B.

The I/O controller 226 typically interfaces to basic input/output devices such as a floppy disk drive 228, a keyboard 30, a mouse 232, a parallel port, a serial port, and, if desired, various other input switches such as a power switch and a suspend switch (not shown). The I/O controller 226 may incorporate a counter and a Real Time Clock (RTC) to track the activities of certain components such as the hard disk 222 and the primary expansion bus. Alternatively, the clock functions may reside on the Advanced Server Management (ASM) unit 230. The ASM unit 230 includes a system watchdog of the type that is found in many conventional computer systems. An example of such a watchdog is the Automatic Server Recovery (ASR) watchdog found in some Compaq Computer Corporation servers.

Figure 3:
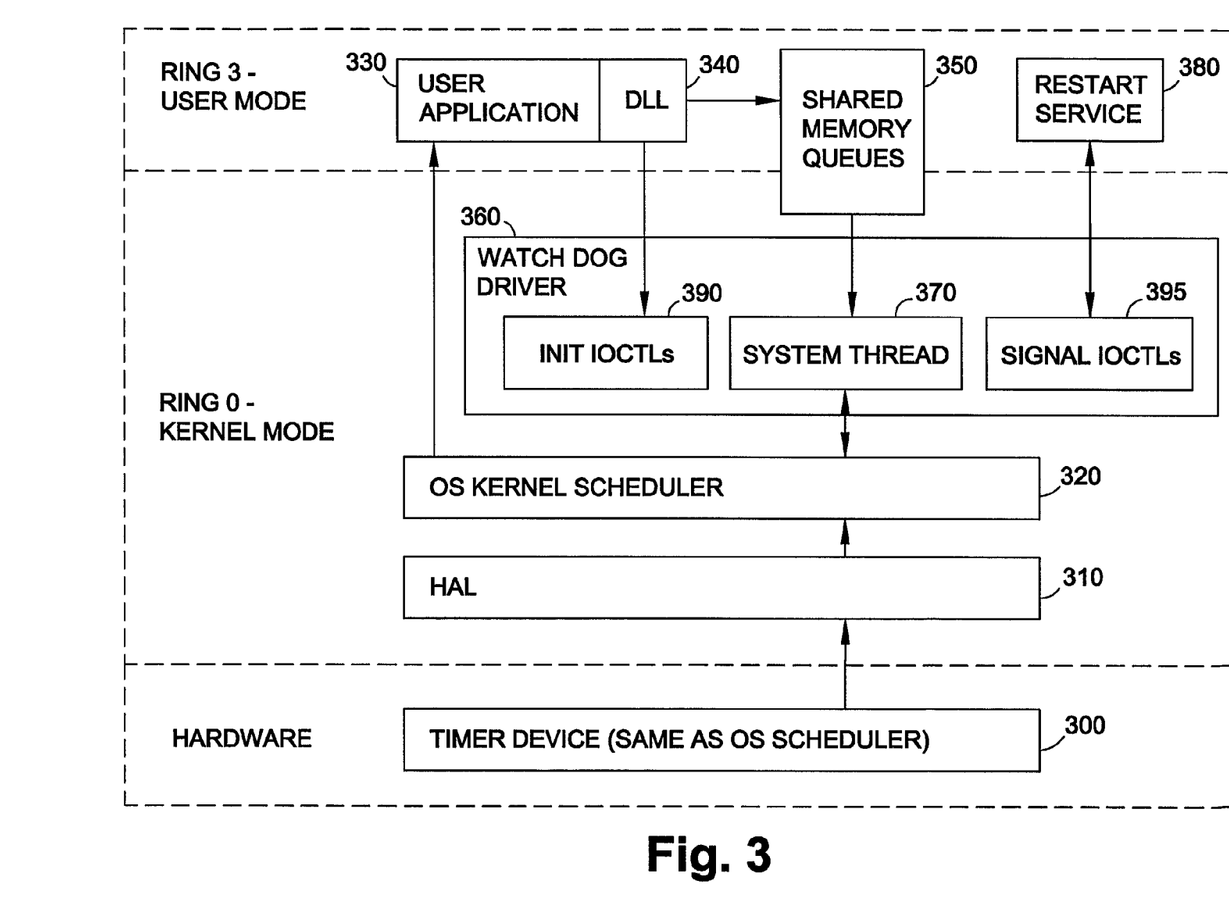
FIG. 3 shows a schematic displaying the hardware and software layer architecture of the preferred embodiment.

Referring now to FIG. 3, a schematic showing the system architecture of the preferred embodiment is shown. The preferred embodiment is described for, but not limited to, a Windows NT environment. The three main levels shown in FIG. 3 represent the hardware/software protection layers in a conventional computer system running the Windows NT operating system. The NT environment provides two software protection levels: Ring 0 and Ring 3. Other systems may provide up to 4 or more protection levels. The Ring 0 protection level, sometimes called the kernel mode or supervisor mode, is the most highly protected ring in which an application or service can run. The Ring 3 protection level, sometimes called the application level or user mode, is the least protected ring. Applications running in Ring 3 cannot physically access memory space in the more highly protected Ring 0 layer. Any communication between applications running in Ring 3 and services in Ring 0 must use a message passing service. This design prevents user applications from interfering with the core NT operating system.

Also shown in FIG. 3 is a Hardware layer, which represents the physical computer system hardware such as the CPU, timer devices, and watchdog devices. For the purposes of illustrating the preferred embodiment, FIG. 3 shows only the applicable timer device 300, which may be a RTC device or other on-board clock. Also included in FIG. 3 is a Hardware Abstraction Layer (HAL) 310, which is used to prevent hardware dependence and provide an isolation layer between the hardware and software. The HAL operates at the Ring 0 level and translates low-level operating system functions into instructions understandable by the physical system hardware.

An operating system kernel scheduler 320 is also found in conventional NT architectures. This scheduler dispatches interrupts and performs kernel mode process and thread scheduling. The scheduler 320 uses the OS clock to perform this scheduling. Since the hardware clock is read by the OS at boot time, the OS clock is theoretically identical to the clock from the hardware device 300. Hence, the scheduler 320 operates using the clock signal from the hardware timer 300 by way of the HAL 310.

Another aspect of FIG. 3 that is common to conventional NT system architectures is the location and execution of a user application 330 in the Ring 3 protection layer. As discussed above, the protection levels are set up to ensure a stable operating system environment. In order to provide access to OS functions and data structures, a set of dynamic link libraries (DLL) 340 are used as extensions to the applications. The application 330 and DLL 340 are typically linked at application load time. Furthermore, a message passing interface is used to permit communication between the application 330 in the application layer and kernel mode drivers in the Ring 0 layer. In FIG. 3, the shared memory queues 350 perform the message passing function as well as manage any asynchronous inter-layer timing differences.

The above described architecture will now be supplemented with a description of the unique aspects and advantages of the preferred embodiment. Among the required components is a kernel mode driver 360 with a system thread 370. The system thread 370 processes information and communicates with the shared memory queues 350 situated between the application 330 and driver 360. A restart service agent 380 is also incorporated to restart desired applications. The restart service may also be configured to restart the entire system much like the hardware watchdog timer, but for the preferred embodiment, the restart service 380 maintains reset control over applications only.

The application watchdog driver 360 also uses I/O control calls (IOCTL), which are user-defined requests and instructions passed to and from kernel mode drivers. In accordance with the preferred embodiment, the watchdog driver 360 establishes an initial IOCTL interface 390 that establishes the appropriate message passing interface 350 and a run-time IOCTL signal interface 395 for communication with the application restart service. The initialization and use of the IOCTL interfaces 390, 395 are described below.

Figure 4:
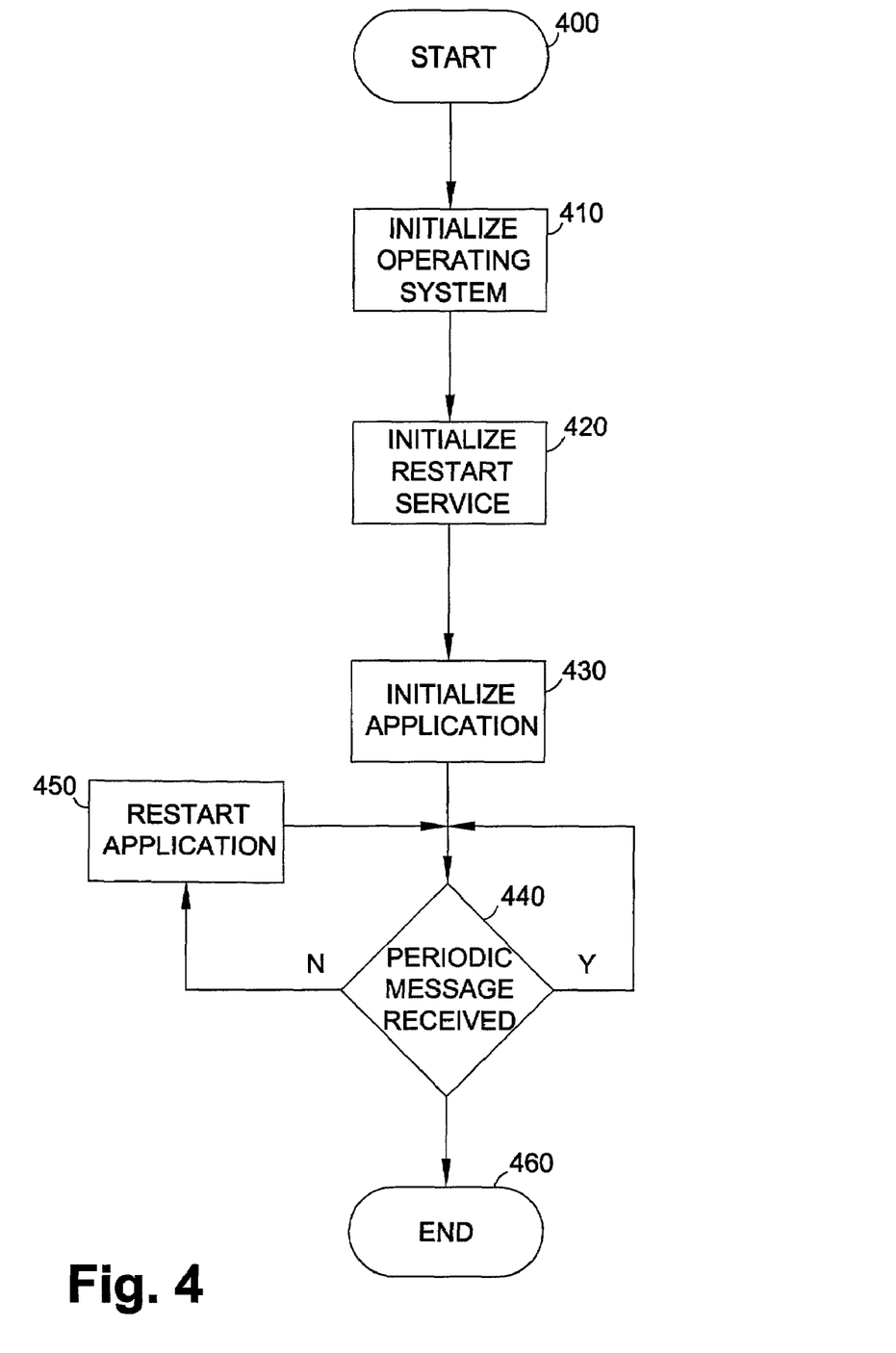
FIG. 4 shows a flow chart describing the initialization and operation of the preferred embodiment.

Referring now to FIG. 4, a simplified flow chart describing the initialization and operation of the preferred embodiment is shown. The following description includes references to the watchdog system architecture as shown in FIG. 3. The START procedure 400 begins during a computer system reset. This reset may be a cold boot, warm boot, or perhaps even a system reset initiated by the system level watchdog timer. After the computer completes the boot operation and executes the POST operation, the operating system will load and initialize 410. During OS initialization 410, the kernel mode watchdog driver 360 will load and create an initial IOCTL 390 interface with commands for establishing the message passing interface. The watchdog driver 360 will also establish an IOCTL signal interface 395 for communication with the restart service 380. As part of the restart service initialization 420, the watchdog restart service 380 will call the watchdog driver 360 to verify existence and operation of the IOCTL signal interface 395. Once the restart service 380 is established, the key user application 330 is started and initialized 430. Once the application is linked to an appropriate DLL 340, the application will call into the DLL 340, which in turn, will make the initialization IOCTL calls 390 into the watchdog driver 360 to establish a connection through the message passing interface or shared memory queues 350. Once this interface is established, no further IOCTL calls will be required. The initialization IOCTL calls 390 will likely have pointers and callback addresses associated with the user application. In response to the initialization IOCTL calls 390, the watchdog driver 360 will, in turn, use the restart service IOCTL interface 395 to update the restart service 380 with application information such as process id's and address information. Thus, the restart service will have information needed to end a particular process and restart the application should the need arise.

During runtime operation the user application sends messages periodically through the interface 350. The watchdog driver system thread 370 will asynchronously monitor the interface 350 for periodic messages from the application 440. If the watchdog driver 360 does not detect a message from the application 330 for a predetermined period of time, the driver 360 will signal the restart service 380 to terminate and restart the application 450. The terminate procedure may consist of killing the appropriate process or ending a task as provided for by the operating system. Otherwise, the application watchdog system simply continues monitoring the shared memory queues 350 for the periodic messages until the application 330 is manually closed down or the computer system is shut down 460.

As discussed above, the restart service 380 may also be configured to provide system restarts if a system administrator feels that is the appropriate reaction. It is envisioned that an alternative embodiment may provide a user interface that allows the user to choose the level of reset capability. For example, the user may be able to choose between application, operating system, or full system reset. Also, the restart service may also perform other functions such as error logging or local/remote user notification.

The watchdog driver 360 preferably includes variables for the various applications to be monitored as well as how frequently messages from the applications should be expected. The driver 360 preferably uses this information and works in conjunction with the OS scheduler 320 to set up alarms or events that will notify the application watchdog driver 360 if a particular application has stopped responding. The timer events represent the end of some allotted period of time during which the watchdog driver 360 should expect a message from the application 330 under normal operating conditions. These timer events are reset or postponed as new messages are detected from the application 330. Thus, detecting a message serves the same function as hitting the watchdog in a conventional watchdog timer. If the timer event actually occurs, this means the application 330 has not delivered a message to the shared memory queues 350 for some time and the application 330 is presumed dead or unresponsive. The application watchdog driver 360 then responds to the timer event by directing the restart service 380 to initiate the appropriate reset procedure.

It is envisioned that the periodic signals sent by the application will be initiated by commands embedded in the computer application software. These commands will be directed at the shared memory queues 350 for the purpose of resetting the application watchdog timer events. It is feasible however, that the commands be sent as part of normal communication with other parts of the computer including the CPU, system memory, or the OS. In this case, the watchdog driver system thread 370 acts as a passive observer checking for activity from the application 330. Other embodiments in accordance with the above teachings are certainly feasible.

The above discussion is meant to be illustrative of the principles and various embodiments of the present invention. Numerous variations and modifications will become apparent to those skilled in the art once the above disclosure is fully appreciated. For example, since the watchdog driver 360 is capable of monitoring several applications, the watchdog system may be configured to provide a user interface to establish priority among the applications. For instance, some sort of policy control may be added that allows the alarm timer events to be delayed more for one application compared to others. This will provide some measure of certainty to ensure that an application has hung before it is restarted. It is intended that the following claims be interpreted to embrace all such variations and modifications.

What is claimed is:

1. A computer system, comprising at least one processor, a system memory coupled to said processor, and at least one input/output device coupled to said processor, wherein the computer system processor is configured to execute:
   an operating system with at least two protection levels;
   a watchdog driver;
   at least one computer application; and
   a user configurable reset service that can be configured to reset the application without resetting the operating system, reset the operating system or perform a restart of the computer system;
   wherein the watchdog driver observes at least one application for a periodic message from and initiated by the application and wherein if the periodic message is not received in a predetermined period of time, the watchdog driver instructs the reset service to initiate a reset procedure to reset the at least one application without resetting the operating system.

2. The computer system of claim 1 further executing:
   a message passing interface configured to transmit signals between the two protection levels;
   wherein the watchdog driver is configured to execute in one protection level and the application is configured to execute in another protection level and wherein the periodic message is transmitted from the application to the watchdog driver through the message passing interface.

3. The computer system of claim 2 wherein:
   the message passing interface is a shared memory queue.

4. The computer system of claim 1 wherein:
   the reset service is configured to close and restart the application upon receiving the instruction to initiate the restart procedure.

5. The computer system of claim 1 wherein:
   the reset service is configured to restart the system upon receiving the instruction to initiate the restart procedure.

6. The computer system of claim 2 wherein:
   the watchdog driver establishes timer events in the operating system scheduler that alert the watchdog driver when the predetermined period of time has expired.

7. An application watchdog for use in a computer system, comprising a user configurable restart service operating in the user mode of a computer operating system, the restart service configurable to reset the application without resetting the operating system, reset the operating system or perform a restart of the computer system and a watchdog driver operating in the kernel mode of the computer operating system comprising, the watchdog driver comprising:
   a system thread configured to monitor a plurality of user applications operating in the user mode of the computer operating system;
   a first input/output control call (IOCTL) signal interface for communicating control signals between the watchdog driver and each of said user applications; and a second IOCTL signal interface for communicating control signals between the watchdog driver and the restart service;
a communication interface for coordinating timer events with the operating system scheduler corresponding to each of said applications and indicating when each of said applications is presumed to be unresponsive;
wherein if the system thread does not receive a message from one of said applications within an allotted period of time, the timer event alerts the watchdog driver that the allotted time has elapsed and the watchdog driver signals the restart service to restart that application without having to restart the computer operating system, reset the computer operating system or perform a full computer system reset depending on how restart service has been configured.

8. The application watchdog of claim 7 wherein:
if the system thread does receive a message from one of said applications, the timer event corresponding to said application is updated to reflect the current time plus the allotted period of time.

9. The application watchdog of claim 7 wherein:
the messages from said applications are sent periodically by the applications and directed specifically to the watchdog driver.

10. The application watchdog of claim 7 wherein:
the messages from said applications are sent to the watchdog driver via a message passing interface between the user mode and kernel mode.

11. The application watchdog of claim 7 wherein:
the restart service is further configured to execute the following;
user notification;
error logging; and
multiple application reset.

12. The application watchdog of claim 7 wherein:
the plurality of applications are prioritized by a computer user to permit varying levels of watchdog protection.

13. The application watchdog of claim 7 wherein:
the restart service is further configured to perform a system reset.

14. A method of detecting and restarting an unresponsive computer application, comprising:
executing the application in a first protective layer of a computer operating system;
executing an application watchdog driver in a second, more protected, protective layer of the computer operating system;
establishing a message passing interface between the application and the watchdog driver;
periodically transmitting signals from the application to the message passing interface;
executing a system thread in the watchdog driver that is configured to monitor the message passing interface for the periodic signals from said application or other applications; and
executing a reset service, the reset service is user configurable to terminate and restart one or more of the applications without resetting the operating system, cause a reset of the computer operating system, or perform a full system reset;
wherein if the system thread fails to detect the periodic signals from the application for a pre-configured amount of time, the watchdog driver initiates a command to the restart service to terminate and restart the application without having to reset the computer operating system.

15. The method of claim 14 wherein:
the message passing interface is implemented as shared memory queues.

16. The method of claim 14 wherein the initialization of the watchdog driver comprises:
loading the watchdog driver as the operating system loads following a computer system boot;
loading and creating an initial input/output control signal interface that establishes the message passing interface; and
loading and creating a second input/output control signal interface for communication with the reset service.

17. The method of claim 16 wherein the initialization of the reset service comprises:
loading the reset service in the first protective layer of the computer operating system; and
calling the watchdog driver via the second input/output control signal interface to verify communication with the watchdog driver.

18. The method of claim 17 wherein the initialization of the computer application comprises:
linking the application with a dynamic link library;
calling the watchdog driver via the dynamic link library and through the initial input/output control signal interface to validate the message passing interface;
sending application location and identification information to the watchdog driver; and
forwarding the application location and identification information to the reset service.

19. The method of claim 14 further comprising:
setting up timer events with the operating system scheduler that alert the watchdog driver when the pre-configured amount of time has elapsed.

20. The method of claim 19 wherein:
when a periodic message is received by the system thread, resetting the timer events.

21. A computer system, comprising:
an operating system with at least two protection levels;
a kernel mode watchdog driver;
at least one user application; and
a user mode reset service, the reset service is configurable to terminate and restart the at least one user application without resetting the operating system, perform a reset the operating system or perform a full computer system reset;
wherein the watchdog driver monitors the at least one user application for a periodic message from the at least one user application and wherein if the periodic message is not received in a predetermined period of time, the watchdog driver instructs the reset service to initiate a reset procedure to reset the at least one user application without resetting the operating system.

22. The computer system of claim 21 wherein:
the reset procedure comprises closing and restarting the application.

23. The computer system of claim 21 wherein:
the reset procedure comprises restarting the operating system.

24. The computer system of claim 21 wherein:
the watchdog driver creates timer events in the operating system scheduler that alert the watchdog driver when the predetermined period of time has expired.

* * * * *

UNITED STATES PATENT AND TRADEMARK OFFICE
CERTIFICATE OF CORRECTION

| | | |
|---|---|---|
| PATENT NO. | : 7,000,100 B2 | Page 1 of 1 |
| APPLICATION NO. | : 09/870965 | |
| DATED | : February 14, 2006 | |
| INVENTOR(S) | : John Lacombe et al. | |

It is certified that error appears in the above-identified patent and that said Letters Patent is hereby corrected as shown below:

On the Title page, in field (75), under "Inventors", in column 1, line 3, delete "Tim" and insert -- Timothy W. --, therefor.

In column 2, line 13, delete "modem" and insert -- modern --, therefor.

Signed and Sealed this

Twenty-fourth Day of March, 2009

JOHN DOLL
*Acting Director of the United States Patent and Trademark Office*